(12) United States Patent
Pozidis et al.

(10) Patent No.: US 8,107,353 B2
(45) Date of Patent: Jan. 31, 2012

(54) DATA STORAGE DEVICE AND METHOD FOR OPERATING A DATA STORAGE SYSTEM

(75) Inventors: Haris Pozidis, Thalwil (CH); Walter Haeberle, Waedenswil (CH); Dorothea W. Wiesmann, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 11/630,879

(22) PCT Filed: Jun. 21, 2005

(86) PCT No.: PCT/IB2005/001733
§ 371 (c)(1),
(2), (4) Date: Aug. 8, 2009

(87) PCT Pub. No.: WO2006/000872
PCT Pub. Date: Jan. 5, 2006

(65) Prior Publication Data
US 2010/0265812 A1 Oct. 21, 2010

(30) Foreign Application Priority Data
Jun. 22, 2004 (EP) .................................. 04405387

(51) Int. Cl.
*G11B 9/00* (2006.01)

(52) U.S. Cl. ...................................................... 369/126
(58) Field of Classification Search .......... 369/126–128, 369/100, 59.11, 116, 53.26
See application file for complete search history.

(56) References Cited

U.S. PATENT DOCUMENTS

| 7,099,257 | B2 * | 8/2006 | Antonakopoulos et al. .. 369/126 |
| 7,245,575 | B2 | 7/2007 | Antonakopoulos |
| 7,463,572 | B2 * | 12/2008 | Frommer et al. ............. 369/126 |
| 2003/0081651 | A1 | 5/2003 | Gianchandani |
| 2008/0304379 | A1 * | 12/2008 | Albrecht et al. ........... 369/47.15 |
| 2009/0003187 | A1 * | 1/2009 | Cherubini et al. ............ 369/126 |

FOREIGN PATENT DOCUMENTS

| JP | 1046231 A | 2/1989 |
| WO | 0237488 A1 | 5/2002 |

* cited by examiner

*Primary Examiner* — Thang Tran
(74) *Attorney, Agent, or Firm* — William Stock; Anne Vachon Dougherty

(57) ABSTRACT

A data storage device comprises a storage medium, at least one probe designed for creating indentation marks in the storage medium, a control unit designed for creating a control parameter (CTRL) acting on the probe resulting in the creation of one indentation mark. The control unit is further designed for modifying the control parameter (CTRL), if at least a given number of consecutive indentation marks with a given minimum distance between each other should be created. According to the method the control parameter (CTRL) is modified if at least a given number of consecutive marks with a given minimum distance between each other should be created.

24 Claims, 8 Drawing Sheets

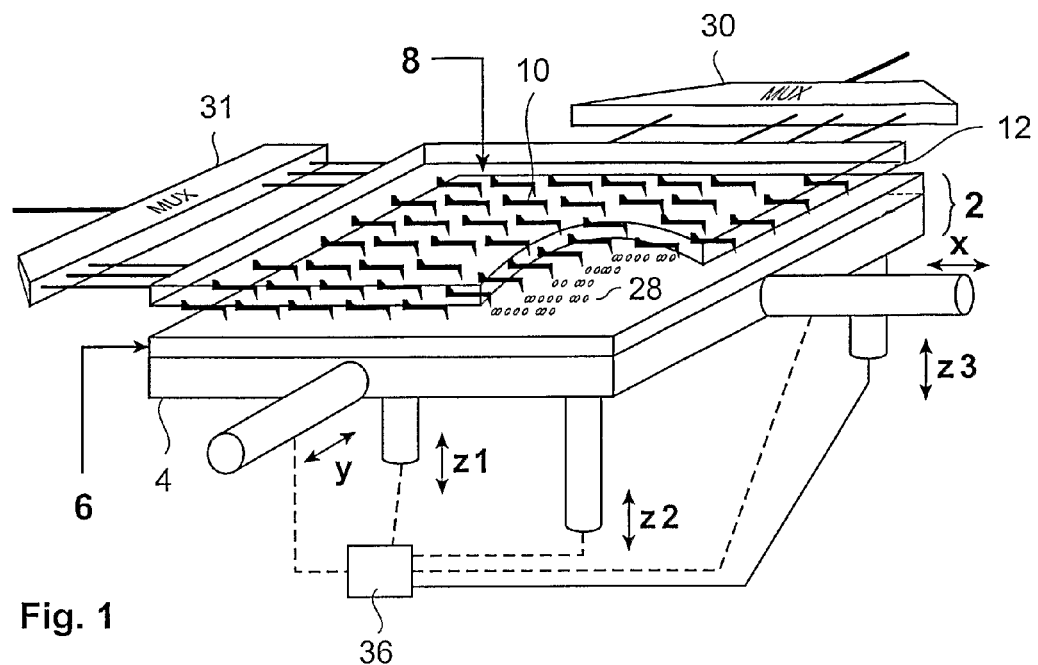
Fig. 1
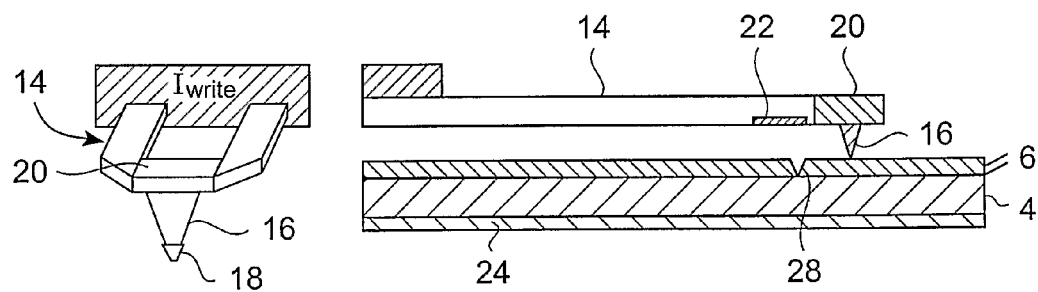
Fig. 3
Fig. 4

DATA STORAGE DEVICE AND METHOD FOR OPERATING A DATA STORAGE SYSTEM

TECHNICAL FIELD

The present invention relates to a data storage device and a method for operating a data storage device.

BACKGROUND OF THE INVENTION

New storage concepts have been introduced over the past few years profiting from the scanning tunneling microscopy and atomic force microscopy technologies. They exploit the capability of these technologies of imaging and investigating the structure of materials down to the atomic scale. Probes having a tip are being introduced for scanning appropriate storage media, where data are written as sequences of bits represented by indentation marks and non-indentation marks. Such indentation marks may only have a diameter in the range of 30 to 40 nm. Hence, these data storage concepts promise ultra-high storage aereal densities.

A data storage device is disclosed in "The Millipede—more than 1000 tips for future AFM data storage" by P. Vettiger et al., IBM Journal Research Development, volume 44, no. 3, May 2000. The data storage device has a read and write function based on a mechanical x-/y-scanning of a storage medium with an array of probes each having a tip. The probes scan during the operation assigned fields of the storage medium in parallel. In that way high data rates may be achieved. The storage medium comprises a thin polymethylmethacrylate (PMMA) layer. The tips are moved across the surface of the polymer layer in a contact mode. The contact mode is achieved by applying small forces to the probes so that the tips of the probes can touch the surface of the storage medium. For that purpose the probes comprise cantilevers which carry the sharp tips on their end sections. Bits are represented by indentation marks or non-indentation marks in the polymer layer. The cantilevers respond to these topographic changes in the surface while they are moved across the surface.

Indentation marks are formed on the polymer surface by thermomechanical recording. This is achieved by heating a respective probe with a current or voltage pulse during the contact mode in a way that the polymer layer is softened locally where the tip touches the polymer layer. The result is a small indentation in the layer having a nanoscale diameter.

Reading is also accomplished by a thermomechanical concept. The heater cantilever is supplied with an amount of electrical energy, which causes the probe to heat up to a temperature that is not high enough to soften the polymer layer as is necessary for writing. The thermal sensing is based on the fact that the thermal conductance between the probe and the storage medium, especially a substrate of the storage medium, changes when the probe is moving in an indentation as the heat transport is in this case more efficient. As a consequence of this the temperature of the cantilever decreases and hence also its resistance decreases. This change of resistance is then measured and serves as the measuring signal.

However it has been observed, that with an increasing data density on the storage medium the probability of data loss increases. Accordingly, it is a challenge to provide a data storage device and a method for operating a data storage device which enables a high data density and a high reliability.

SUMMARY OF THE INVENTION

According to one aspect of the invention, a data storage device is provided, comprising a storage medium, at least one probe designed for creating indentation marks in the storage medium, a control unit designed for creating a control parameter acting on the probe resulting in a creation of one of the indentation marks. The control unit is further designed for modifying the control parameter, if at least a given number of consecutive indentation marks with a given minimum distance between each other should be created. The indentation marks represent data, preferably logical "1"s whereas the absence of indentation marks preferably represents logical "0"s.

Especially in the case when the creation of the indentation marks takes place in the direction of rows or respective columns consecutive indentation marks may be consecutive indentation marks in one row or also in one column.

By modifying the control parameter if at least a given number of consecutive indentation marks with a given minimum distance between each other should be created, a partial erasing between neighboring indentation marks due to the width and depth of such neighboring indentation marks, which has been observed before, is significantly reduced or eliminated and at the same time the indentation marks remain deep so that a noise margin is not affected and the data storage device has a high reliability. Partial erasing of an indentation mark means the reduction of the depth of an indentation mark from a nominal value to a smaller value.

In a preferred embodiment of the data storage device the control unit is designed for modifying the control parameter by varying the time of its application to the probe, resulting in a varying time between the formation of consecutive indentation marks. Provided the storage medium is moved in relation to the probe at constant velocity, a variation in time results in a variation of the distance between consecutive written indentations. Modifying the control parameter by varying the time of its application to the probe is very simple. By suitably modifying the control parameter in this way, which includes taking care that the variation does not become too large, a very large noise margin may be obtained and in that way the probability of data loss becomes very low.

In another preferred embodiment of the data storage device the control unit is designed for modifying the control parameter by varying the time of its application to the probe such that consecutive indentation marks are created with a shift to a nominal minimum time-interval between two consecutive indentation marks, wherein the shift has a minimum value for the first one of said consecutive indentation marks and gradually increases to a maximum value towards the last one of the consecutive indentation marks. The nominal minimum time-interval between the creation of two consecutive indentation marks is the time-interval between the creation of two consecutive indentation marks, if the control parameter is not modified. The minimum value may be a negative value, it may however also be zero or a positive value. The maximum value is always larger than the minimum value and may be a positive value or may also be zero or a negative value. The largest noise margins have been achieved, if a minimum value is a negative value and the maximum value is a positive value. By increasing the shift from the minimum value for the first one of the consecutive indentation marks gradually to the maximum to the last one of the consecutive indentation marks a very uniform structure of the individual consecutive indentation marks is obtained and in that way the consecutive indentation marks can be detected with a low probability of a detection error.

In another preferred embodiment of the storage device the control unit is designed such that the minimum value has the same absolute value as the maximum value and that an indentation mark in the middle of the consecutive indentation marks is created with a shift of a smallest absolute value. This smallest absolute value is preferably around zero. It has been observed that in that way the probability of data loss is extremely low. In the case of an even number of consecutive indentation marks the middle of the consecutive indentation marks may either be the indentation in the middle of an odd number of consecutive indentation marks, which is less by one, or more by one than the even number of the consecutive indentation marks.

In another preferred embodiment the data storage device is designed such, that the control parameter influences a force being exerted between the probe and the storage medium. With the probe, that is suitably equipped for varying the force exerted between the probe and the storage medium this control parameter can simply be modified. It has further been observed that by varying the force with only little additional power dissipation a very low probability of a erroneous detection of consecutive indentation marks during a reading operation of the data storage device can be obtained.

In a further preferred embodiment of the data storage device the control unit is designed such, that the force is decreased from a maximum force applied for forming a first one of said consecutive indentation marks to a minimum force applied for forming a last one of said consecutive indentation marks. A first one of the consecutive indentation marks means in this respect the first indentation mark formed in respect to time whereas the last indentation means the indentation last formed in respect to time. This advantageously uses the finding that in consecutive indentation marks created without changing the control parameter, only the last indentation mark created in time does not show a partial erasing, whereas the others show partial erasing. The force influences the size of the individual indentation mark by decreasing the force from the maximum force applied for forming the first of the consecutive indentation marks to a minimum force applied for forming the last of the consecutive indentation marks, so that the consecutive indentation marks may be fairly uniformly formed. In that way the probability of data loss is minimized. The minimum force may be determined taking into consideration noise margin constraints based on an average read-back amplitude of isolated indentation marks. The maximum force may be determined taking into consideration aspects such as wear of a tip of the probe and the data storage medium or feasibility of the generation of, for example, high voltages by the control unit and also taking into consideration the nominal minimum distance between two consecutive indentation marks. Preferably the difference between the minimum and the maximum force should be a fraction of the minimum force for a good performance.

In another preferred embodiment the data storage device is designed such, that the force depends on a relative position of each of the consecutive indentation marks, that the force decreases for a given number of consecutive indentation marks and is limited between the maximum and minimum force and is independent from a total number of consecutive indentation marks. This has the advantage of having a high simplicity.

In another preferred embodiment of the data storage device the control unit is designed such, that the control parameter influences a heating power being generated in the probe and being transmitted to the storage medium. This has the advantage, that the heating power may be simply and precisely modified. In addition to that the heating power strongly influences the size of the indentation marks.

In another preferred embodiment of the storage device the control unit is designed such, that the heating power is decreased from a maximum heating power applied for forming a first one of the consecutive indentation marks to a minimum heating power applied for forming a last one of the indentation marks. A first one of the consecutive indentation marks means in this respect the first indentation mark formed in respect to time whereas the last indentation means the indentation last formed in respect to time. This advantageously uses the finding that in consecutive indentation marks created without changing the control parameter, only the last indentation mark created in time does not show a partial erasing, whereas the others show partial erasing. The heating power influences the size of the individual indentation mark by decreasing the heating power from the maximum heating power applied for forming the first of the consecutive indentation marks to a minimum heating power applied for forming the last of the consecutive indentation marks, so that the consecutive indentation marks may be fairly uniformly formed. In that way the probability of data loss is minimized. The minimum heating power may be determined taking into consideration noise margin constraints based on an average read-back amplitude of isolated indentation marks. The maximum heating power may be determined taking into consideration aspects such as feasibility of the generation of, for example, high voltages by the control unit and also taking into consideration the nominal minimum distance between two consecutive indentation marks. Preferably the difference between the minimum and the maximum heating power should be a fraction of the minimum power for a good performance.

In another preferred embodiment of the data storage device the control unit is designed such, that the heating power depends on the relative position of each of the consecutive indentation marks, decreases for a given number of consecutive indentation marks and is limited between the maximum and minimum heating power and is independent from a total number of consecutive indentation marks. This has the advantage of having a high simplicity.

It is appreciated that in another preferred embodiment, a modification of the control parameter can simultaneously comprise a modification of the time the control parameter is applied to the probe, a modification of the force being exerted between the probe and the storage medium, and a modification of the heating power being applied to the storage medium via the probe, or any combination thereof.

In another preferred embodiment of the data storage device it comprises a coding unit for coding information being represented by the existence or absence of indentation marks in a way, that at least a minimum amount of absent indentation marks is placed between units of information being in a decoded way represented by consecutive indentation marks and at the same time reducing the minimum distance between consecutive indentation marks/absent indentation marks in relation to the minimum amount of absent indentation marks. Such codes are called (d,k)-codes, for example. Information in the form of bits may have in the (d,k)-coded state more bits but at the same time reducing the minimum distance between consecutive indentation marks, which might represent logical "1"s, the overall data density on the storage medium is increased and in that way by appropriately choosing the d, k parameter of the (d,k)-codes the information density on the data storage medium may be increased.

In another preferred embodiment the data storage device comprises a further coding unit for coding information being represented by the existence or absence of indentation marks in a way that a given number of consecutive indentation marks with the given minimum distance between each other is not exceeded. In that way the probability of a data loss may be further decreased if the given number of consecutive indentation marks is chosen appropriately. Codes being able to limit the number of consecutive indentation marks with the given minimum distance between each other are called constrained codes.

According to another aspect of the invention a method for operating the data storage device is claimed with the data storage device comprising a storage medium, at least one probe designed for creating indentation marks in the storage medium and a control unit designed for creating a control parameter acting on the probe resulting in a creation of one of the indentation marks. According to the method the control parameter is modified, if at least a given number of consecutive indentation marks with a given minimum distance between each other should be created.

In a preferred embodiment of the method the control parameter is modified by varying the time of its application to the probe resulting in a varying time between the formation of consecutive indentation marks.

In another preferred embodiment of the method the consecutive indentation marks are created with a shift to a nominal minimum time interval between two consecutive indentation marks and the shift has a minimum value for the first one of the consecutive indentation marks and increases gradually to a maximum towards the last one of the consecutive indentation marks.

In another preferred embodiment of the method the minimum value has the same absolute value as the maximum value and the indentation mark in the middle of the consecutive indentation marks is created with a shift of a smallest absolute value.

In another preferred embodiment of the method the control parameter influences a force being exerted between the probe and the storage medium.

In another preferred embodiment of the method the force depends on the relative position of each of the consecutive indentation marks, decreases for a given number of consecutive indentation marks, is limited between the maximum and minimum force and is independent from a total number of consecutive indentation marks.

In another preferred embodiment of the method the force is decreased from a maximum force applied for forming a first one of the consecutive indentation marks to a minimum force for forming a last one of the consecutive indentation marks.

In another preferred embodiment of the method the control parameter influences a heating power being applied to the storage medium via the probe.

In another preferred embodiment of the method the heating power is decreased from a maximum heating power applied for forming a first one of the consecutive indentation marks to a minimum heating power applied for forming a last one of the consecutive indentation marks.

In another preferred embodiment of the method the heating power depends on the relative position of each of the consecutive indentation marks, decreases for a given number of consecutive indentation marks and is limited between the maximum and the minimum heating power and is independent from a total number of consecutive indentation marks.

In another preferred embodiment of the method a coding unit codes information being represented by the existence or absence of indentation marks in a way, that a given number of consecutive indentation marks with the given minimum distance between each other is not exceeded.

In another preferred embodiment of the method a further coding unit codes information being represented by the existence or absence of indentation marks in a way, that at least a minimum amount of absent indentation marks is placed between units of information being in an uncoded case represented by consecutive indentation marks and effectively at the same time reducing the minimum distance between consecutive indentation marks in relation to the minimum amount of absent indentation marks.

According to another aspect of the present invention, there is provided a computer program element comprising computer program code for executing a method according to any one of the claims 13 to 24 when loaded in a processing unit of a control unit.

Advantages of the method for operating the data storage device and its preferred embodiments correspond to the advantages of the data storage device.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating:

FIG. 1, a perspective view of a data storage device,

Figure 2:
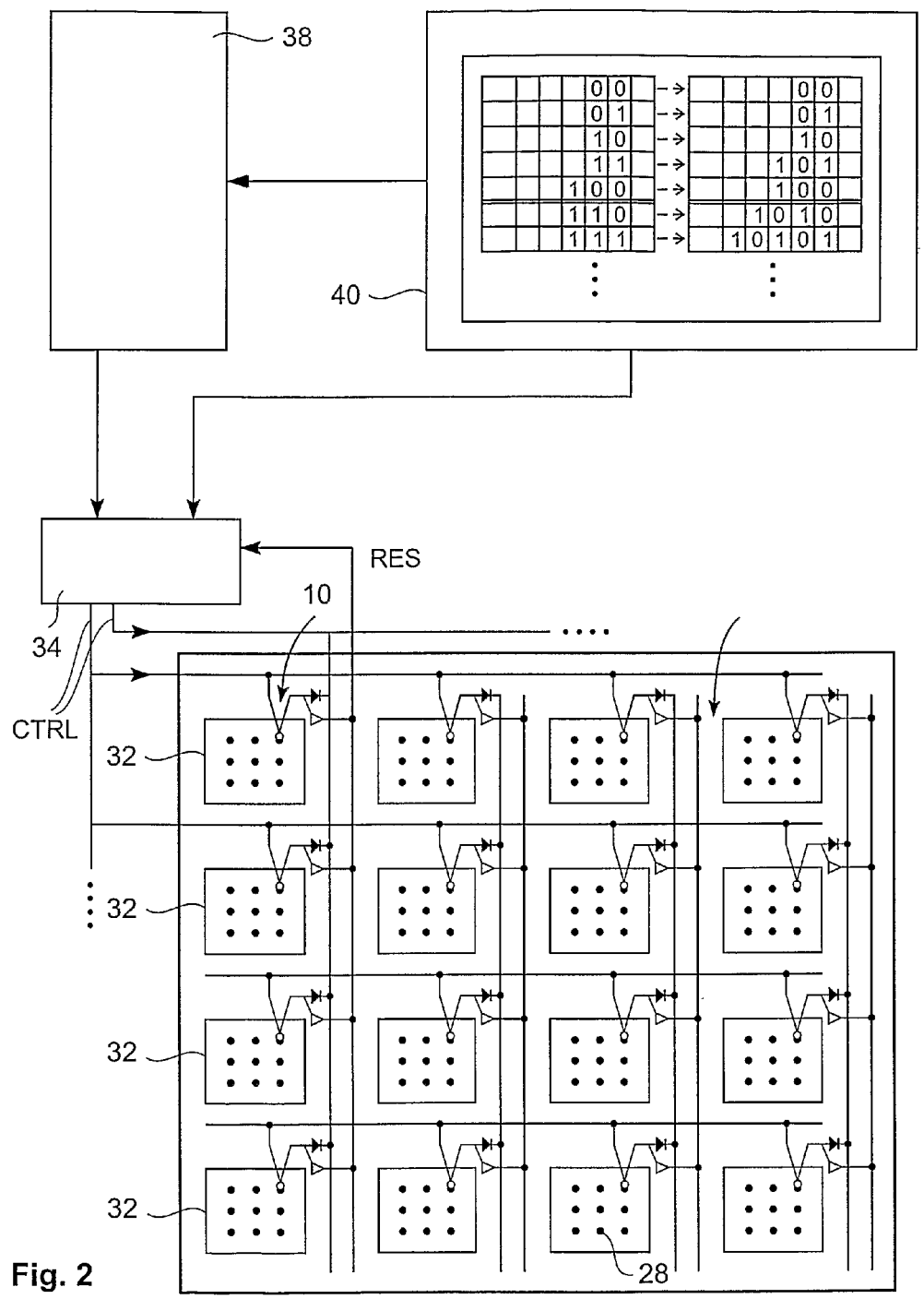
FIG. 2, a top view of a data storage medium with a symbolic probe array that forms part of the data storage device according to FIG. 1, FIG. 3, a perspective view of a probe, FIG. 4, a cross-sectional view of the probe according to FIG. 3 and the data storage medium, FIG. 5, a first embodiment of a program being processed during the operation of the data storage device, FIG. 6, a second embodiment of the program being processed during the operation of the data storage device, FIG. 7, a third embodiment of the program being processed during the operation of the data storage device, FIG. 8, a histogram of read-back samples without changing the control parameter acting on the probe resulting in a creation of the indentation marks if at least a given number of consecutive indentation marks with a given minimum distance between each other should be created, FIGS. 9 and 10, histograms of read-back samples with indentation marks being created with the aid of processing a program according to FIG. 5.

Different figures may contain identical references, representing elements with similar or uniform content.

DETAILED DESCRIPTION OF THE DRAWINGS

FIG. 1 shows a perspective view of a data storage device. A storage medium 2 comprising a substrate 4 and a polymer layer 6 is facing a probe array 8 having a plurality of probes 10. The substrate 4 is preferably formed of silicon, the polymer layer 6 of a thin polymethylmethacrylate (PMMA) layer. Probes 10 are mechanically linked to a linking element 12 having the shape of a plate. The linking element 12 is transparent and cut open at one edge solely for demonstration purposes.

FIG. 3 shows a perspective view of a single probe 10. The probe comprises a spring cantilever 14 with a tip 16 at its end. The spring cantilever 14 is sensitive to vertical forces. The stiffness of the spring cantilever 14 in a lateral direction is much higher than in the vertical direction.

The tip 16 is conically-shaped and has a decreasing diameter towards its apex 18. The apex 18 has preferably a radius of only a few nanometers. Ideally only one atom forms the apex 18 of the tip 16.

The probe 10 further comprises a heater platform 20 between legs of the spring cantilever 14 and the tip 16. The probe 10 further may comprise a first electrode 22, that acts together with a second electrode 24 formed in or on the storage medium forming a capacitor. Depending on the charge of this capacitor a force acting vertically to the surface of the storage medium 2 can be applied on the spring cantilever 14. The spring cantilever 14 is preferably fabricated entirely of silicon for good thermal and mechanical stability. The legs of the spring cantilever 14 are preferably highly doped in order to minimize their electrical resistance as they also serve the purpose of an electrical connection to the heater platform 20, the heater platform has a high electrical resistance of, for example, 11 kilo Ohms. The legs also serve the purpose of an electrical connection to the first electrode 22.

Indentation marks 28 are created on the storage medium 2 using a thermomechanical technique. A local force is applied to the polymer layer 6 by the probe 10. The polymer layer 6 is softened by heating the heater platform 20 with a current or voltage pulse during the contact mode, so that the polymer layer 6 is softened locally where the tip 16 touches the polymer layer 6. The result is a small indentation mark 28 in the polymer layer (see FIG. 4) having a nanoscale diameter.

The indentation marks 28 represent binary information. For example, an indentation mark may represent a logical "1" and the absence of the indentation mark 28 may represent a logical "0".

However, the indentation mark 28 or an absence of the indentation mark 28 may also represent a different information, for example the presence of the indentation mark 28 may represent a logical "0" and the absence of the indentation mark 28 may represent a logical "1".

In order to read data, the polymer layer 6 is moved under the probe array 8 at a constant velocity. The scanning velocity and the distance between the indentation marks 28 determine the data rate of the system in indentation marks 28 or bits read or written per second. Reading is also accomplished with a thermomechanical concept. For reading purposes the heater platform 20 is operated at a temperature, that is not high enough to soften the polymer layer 6 as is necessary for writing. The thermal sensing is based on the fact that the thermal conductance between the probe 10, in particular the heater platform 20 and the tip 16, and the storage medium 2 changes when the tip 16 is moving into an indentation mark 28 where the distance between the heater platform 20 and the polymer layer 6 is reduced. During a motion of the tip 16 the temperature change of the heater platform 20 is gradual as it moves towards the center of the indentation mark 28, where the indentation mark's 28 depth is maximum. Consequently the resistance of the heater platform 20 decreases at the same time. Thus changes in the resistance of the heater platform 20 may be monitored while the probe 10 is scanned over indentation marks 28.

Solely for demonstration purposes indentation marks 28 are shown only in a confined area of the storage medium 2 back in FIG. 1. In the preferred embodiment the probes 10 are suited for scanning the entire storage medium 2 either by moving the probe array 8 relatively to a storage medium 2 or vice versa. In FIG. 1 the storage medium 2 is moved while the probe array 8 is fixed in its position. Arrows X and Y indicate the scanning direction, while Z arrows indicate an approaching and leveling scheme in vertical direction for bringing the entire probe array 8 into contact with the storage medium 2. For that purpose the storage device comprises a respective drive 36, the drive 36 comprises respective actuators, for example electromagnetic or piezoelectric actuators by means of which actuation in each direction is precisely achieved. The drive may also only act on the X and Y scanning direction, with the approaching and leveling scheme in vertical direction being accomplished by controlling the charge of the capacitor comprising the first and second electrode 22, 24.

The storage medium 2 is divided into fields, not explicitly shown in FIG. 1. Each probe 10 of the probe array 8 writes or reads only in its own data field. Consequently a storage device with, for example 32×32 probes includes 1024 fields.

The storage device is preferentially operated with row and column time-multiplexing addressing, schematically shown by multiplexers 30, 31. The storage device according to FIG. 1 is ready for parallel scanning of all fields. Storage fields might also be scanned row by row or column by column. Every movement of a single probe 10 in the X, Y direction is applied to all the other probes 10 due to mechanical coupling of the probes 10.

FIG. 2 represents a symbolic top view of the storage medium 2 with 4×4 fields 32 arranged in rows and columns. Each field 32 comprises indentation marks 28. There are symbolic nine indentation marks 28 disclosed within each field 32. This amount is of course not of true nature but only symbolic as it is customary for these kind of storage devices to pack as many data marks on the storage medium 2 as resolution allows. The fields 32 are bordered in order to make them visible. Such borders in forms of grooves might also be placed on the storage medium 2 for defining the beginning and the end of a field 32, but this is not necessarily the case. Rather fields 32 are defined by the extent of indentation marks 28 a single probe 10 is responsible for.

In addition, only a few symbolic probes 10 are shown. The probes 10 are electrically connected with the multiplexers 30, 31, which are preferentially time multiplexers. Their connection with the multiplexers 30, 31 is represented symbolically with common wires in FIG. 2. In case the probes 10 are equipped with first electrodes 22 there are separate electrical connections to the multiplexers 30,31 for connecting the first electrodes 22 apart from the heater platforms 20.

A control unit 34 is designed for creating control parameter CTRL acting on the probes 10 and resulting in a creation of indentation marks 28. It is further designed for controlling a read-back procedure, by which the information stored on the storage medium 2, represented by indentation marks or the absence of indentation marks 28 is read back RES and is also designed for processing this read back information.

A first coding unit 40 is provided, which receives information data during the operation of the data storage device, this information data is preferably in a binary coded form, that means the information consists of a sequence of logical "1" and logical "0". It is assumed that a logical "1" corresponds to forming an indentation mark while a logical "0" indicates the absence of forming an indentation mark 28. However, if a logical "0" corresponds to an indentation mark 28 and a logical "1" corresponds to the absence of the indentation mark 28 the following disclosure applies respectively.

The first coding unit 40 codes the received information, which is of a binary coded type, by applying so-called (d,k)-codes. In this context d denotes a minimum number of consecutive logical "0"s placed between consecutive logical "1"s in a code series. k denotes a maximum number of consecutive logical "0"s placed between consecutive logical "1"s in a code series. Such (d,k)-codes are disclosed in "Codes for Mass Data Storage Systems" by Kees A. S. Immink, Shannon Foundation Publishers, Rotterdam, The Netherlands, 1999. Such (d,k)-codes are further disclosed in U.S. Pat. No. 6,340, 938, which is incorporated by reference for this purpose. One example of a (d,k)-code disclosed therein is a (1,7)-code with an additional constraint of a limit value of 5 and a rate of two-thirds. Coding the information data with such a code has the advantage that the equivalent distance between two consecutive indentation marks 28, representing logical "1"'s may be reduced respectively. In the uncoded case, two consecutive indentation marks placed at the minimum possible distance apart from each other are represented by the bit sequence 11. In the case of a (1,7) (d,k) code such consecutive two indentation marks placed at the minimum possible distance apart from each other are represented by the bit sequence 101. In that way the physical nominal distance between two consecutive coded bits may be halved. In that way in total the information stored on the data storage device, in particular on the storage medium 2, may be increased without having additional problems concerning partial erasing of neighboring consecutive indentation marks 28. For the coding purposes the first coding unit 40 preferably comprises a look-up table, part of an example of which is schematically shown in FIG. 2 inside the block showing the first control unit 40. The coded information is then either directly transmitted to the control unit 34 or it may also be an input to a further, a second coding unit 38.

The second coding unit 38 may either receive information in a coded form from the first coding unit 40 or it may receive uncoded data information. The second coding unit 38 limits the number of consecutive logical "1"s, in case of uncoded data input or "01"s in case of (1,7) (d,k) coded data input or "001" or "0001" and so on in case of other coded data input to a given limit value. Codes being suitable for that purpose are called constrained codes. The limit value is preferably chosen between 5 and 7, most preferably 7. The limit value may be chosen in accordance with a minimum nominal distance between two consecutive indentation marks 28. The smaller this nominal minimum distance is the smaller the limit value should be chosen. However the limit value may also be chosen appropriately depending on the embodiment of a program being processed in the control unit 34 and controlling the creation of indentation marks and the way the respective parameters of the program are chosen.

Figure 5:
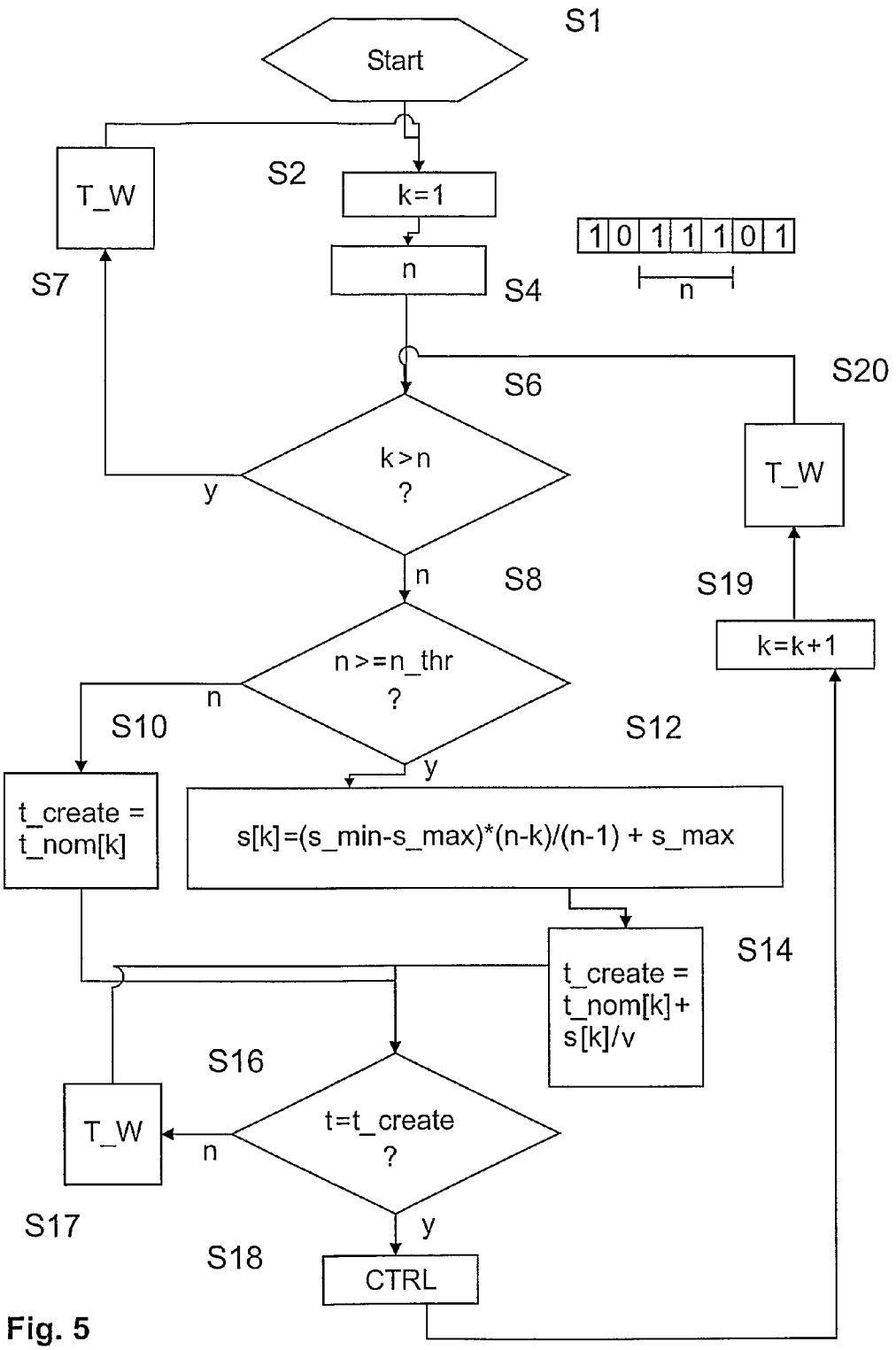

A program which is processed during the operation of the data storage device in the control unit 34 is described in the following with the aid of the flow chart of FIG. 5. The program is started in a step S1. In this step preferably variables are initialized.

In a step S2 a counter k is initialized with a value of one. In a step S4 a number n of consecutive indentation marks 28 to be created is determined by counting the number of consecutive logical "1"s or "01"s or "001"s depending on the coding applied in the first coding unit 40 of the current input data string received from the first or the second coding unit 38, 40 or from another unit possibly in an uncoded way.

In a following step S6 it is determined whether the counter k is greater than the number n of consecutive indentation marks 28 to be created. If this is the case the program proceeds to a step S7, where the program rests for a given duration of time T_W before it proceeds again to step S2. The given duration T_W of time is chosen appropriately in order to ensure, that each information bit is processed appropriately.

However, if the counter k is not greater than the number n of consecutive indentation marks 28 to be created then the program proceeds to a step S8 in which it is checked whether the number n of consecutive indentation marks 28 to be created is larger or equal to a given number n_thr of consecutive indentation marks to be created. The given number n_thr of consecutive indentation marks 28 to be created is preferably chosen with a value of 2.

If the condition of step S8 is not fulfilled, the program proceeds to a step S10, in which a point of time t_create for creating a control parameter CTRL is set to a nominal point of time t_nom for the respective current counter value k. The nominal point of time t_nom may be chosen for example in a range, that two consecutive creation events of creating the control parameter CTRL are spaced apart 360 microseconds.

If the condition of step 8 is fulfilled the program proceeds to step S12. In the step S12 a shift s for the respective value of the counter k is determined according to the relation shown in step S12, where s_min denotes a minimum shift and s_max denotes a maximum shift. The given minimum shift s_min has preferably a negative value, whereas the given maximum shift s_max has preferably a positive value. A given maximum shift s_max and the given minimum shift s_min preferably have the same absolute value but their absolute values may also differ from each other. The absolute values of the given maximum shift s_max and the given minimum shift s_min preferably are in the range of just a small fraction of the nominal minimum time interval between two consecutive creations of indentation marks 28. They may be in the range of one-sixth of this time.

The relation for determining the shift s for the current value of the counter k has a linear course. It may alternatively also have a course with a progressively decreasing absolute value of the shift s towards the middle of the number n of consecutive indentation marks 28 to be created and then from the middle on again having a progressively increasing absolute value of the respective shift s. A course of the shift may in this case also be symmetric to the middle of its course, that is the value of the counter k being equal to n/2. The shift s corresponding to the indentation mark to be created in the middle of consecutive indentation marks 28 to be created has preferably an absolute value in the range of zero.

If the number n of consecutive indentation marks 28 to be created is an even number then the shift corresponding to the counter k equal to (n−1) divided by 2 or (n+1) divided by 2 preferably has the shift s with the smallest absolute value.

The program proceeds after the step S12 to a step S14 where the point of time t_create for creating the control parameter CTRL is set to the nominal point of time t_nom for creating the control parameter CTRL for the current value of the counter k plus the current shift s determined in step 12 divided by a velocity v of the probe 10 relative to the storage medium 2 in an x or y direction.

After that in a step S16 it is evaluated, whether the current point of time t is the point of time t_create for creating the control parameter CTRL. If the condition of step S16 is not fulfilled then the program proceeds to a step S17, where it rests for the given duration of time T_W before the condition of step S16 is again evaluated. The given duration of time T_W is suitably chosen. If however, the condition of step S16 is fulfilled the program proceeds to a step S18 where the control parameter CTRL is created. The control parameter may for example be a voltage pulse affecting the heater platform 20 and in that way heating the heater platform 20. It may also be a respective current pulse affecting the heater platform 20. It may also be a current or voltage pulse affecting the first electrode 22 or respectively the second electrode 24. It may also be a combination of both. For this embodiment the control parameter CTRL preferably always has the same value when it is created. After the step S18 the program proceeds to a step S19 where the counter k is incremented by one. After that the program proceeds to a step S20, where the program rests for the given duration of time T_W before it proceeds again to step S6. The given duration T_W of time is chosen appropriately in order to ensure, that each information bit is processed appropriately.

Figure 6:
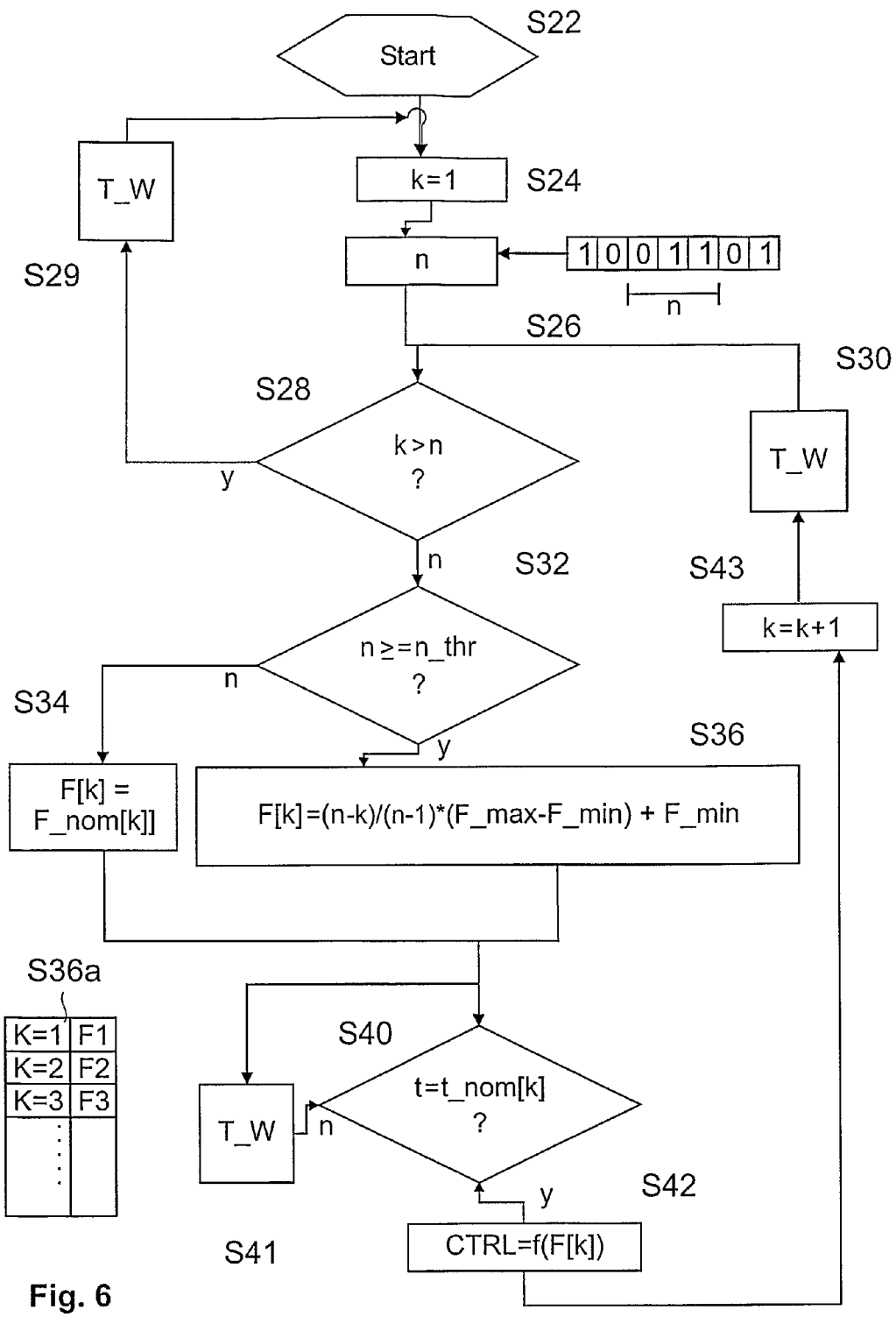

FIG. 6 shows a second embodiment of the program which is processed in the control unit 34 during the operation of the storage device. The steps S22, S24, S26, S28, S29, S30, S32 and S43 correspond to the steps of FIG. 5, S1, S2, S4, S6, S7, S20, S8 and S19.

If the condition of step 32 is not fulfilled, that is if the number n of consecutive indentation marks 28 to be created is smaller than the given number n_thr, then the program proceeds to a step S34, where a force F corresponding to the current value of the counter k is assigned a nominal value F_nom of the force. If, however, the condition of the step S32 is fulfilled, then the force F for the current value of the counter k is assigned a value determined depending on the relation shown in the step S36. F_max denotes a maximum force whereas F_min denotes a minimum force. The force in general is the force exerted by the tip 16 on the polymer layer 6 while the control parameter is created. The minimum force F_min is predetermined taking into consideration noise margin issues based on an average read-back amplitude of isolated indentation marks 28, that means indentation marks, that are not spaced at the given minimum distance from other adjacent indentation marks, but of at least twice that distance. The given minimum distance might be, for example, 35 nm. Such isolated indentation marks 28 typically result during a reading operation in a read-back amplitude which typically is above a certain threshold for a given amount of noise in the read-back signal. The maximum force F_max may be limited by influencing factors such as wear of tip 16 or the feasibility of the generation of respectively high voltage pulses in a driver incorporated in the control unit.

The given relation in step S36 results in a linear reduction of the force F with an increasing value of the counter k. In that way partial erasing between consecutive indentation marks 28 is effectively reduced. The relation of the step S36 may also have another course. It is only essential that the amount of applied force is gradually decreasing.

Following the step S36 or respectively the step S34 the program proceeds to a step S40 where it evaluates whether the current point of time t equals the nominal point t_nom of time corresponding to the current value of the counter k. If this is not the case the program proceeds to a step S41, where it rests for the given duration T_W of time before it proceeds again to the step S40. If the condition of the step S40 is fulfilled then the program proceeds to a step S42 in which it creates the control parameter CTRL corresponding to the current value of the force F for the current value of the counter k. The control parameter may be assigned to the current force F via a look-up table. The control parameter CTRL is preferably a current or voltage pulse affecting the first or the second electrode 22, 24.

In a step S43 the counter k is incremented by one. After the step S43 the program proceeds to the step S30.

Alternatively to the relation given in step S36 the force F for the current value of the counter k may be determined in an alternative step S36a by the use of, for example, a look-up table with given values of the force F corresponding to the values of the counter k. For example a given first force F1 is assigned if the current value of the counter k equals 1. The same applies respectively for a second force F2 which is assigned, if the current value of the counter equals 2 and a third force F3 is assigned if the current value of the counter equals 3. The condition that these given first to third forces F1, F2, F3 and possibly further given forces need to fulfill is that none of them exceeds the maximum force F_max or is smaller than the minimum force F_min and that consecutive forces corresponding to an increasing value of the counter k either decrease or stay at the same value. After the step S36a the program proceeds to the step S40. By applying such a fixed relation between the current value of the counter k and the respective force F a simple relation is established which gives good results in view of the prevention of partial erasing between consecutive indentation marks 28, especially if the number of consecutive indentation marks 28 is limited to a low value, for example 5. This may be achieved by previously coding the information data respectively in the second coding unit 38.

Figure 7:
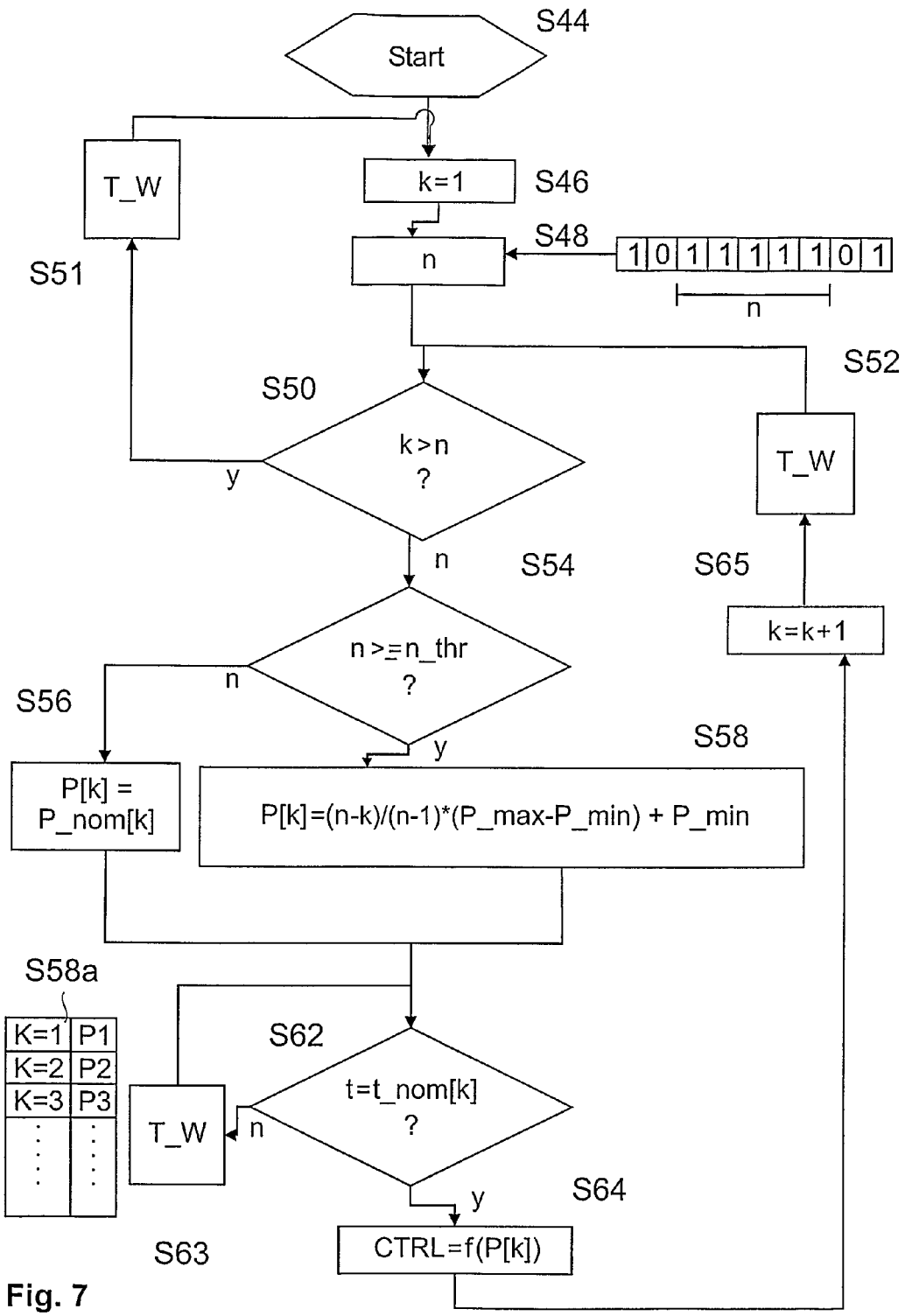

A third embodiment of the program, which is processed in the control unit 34 is shown by the aid of the flow chart of FIG. 7. The flow chart of FIG. 7 basically corresponds to the flow chart of FIG. 6 with the steps S44, S46, S48, S50, S51, S52, S54, S62, S63 and S65 corresponding to the steps S22, S24, S26, S28, S29, S30, S32, S40, S41 and S43.

The step S56 respectively corresponds to the step S34 with the difference that instead of the force a heating power P for the current value of the counter k is assigned a nominal heating power P_nom which is predetermined. In a step S58 instead of the force F the heating power P for the current value of the counter k is assigned a value depending on the relation given in step S58. P_max denotes a maximum heating power and P_min denotes a minimum heating power. The maximum heating power P_max and the minimum P_min are predetermined taking into consideration the same constraints which apply for the maximum force F_max and the minimum force F_min as in step S36 of FIG. 6.

In a step S64 the control parameter is created in dependence on the heating power P for the current value of the counter k. The control parameter CTRL affects in this case preferably the heater platform 20. The control parameter is in this case preferably either a voltage or a current pulse.

Alternatively to the step S58 a step S58a may be processed, which incorporates a respective look-up table as in step S36a with the difference that in this case respective values of the heating power P are assigned depending on the value of the counter k. In the case of the step S58a a first given heating power P1 is assigned if the counter k has a value of 1, a second given heating power P2 is assigned if the counter k has a value of 2 and a third given heating power P3 is assigned if the counter k has a value of 3. The conditions that these given first to third heating powers P1 to P3 and possibly further given heating powers need to fulfill are identical to the conditions described above for the forces F1 to F3 and possibly further given forces.

If the information data received by the control unit 34 is coded in the first coding unit by applying a (d,k)-code then the counter n counts consecutive patterns of (0 1) or (1 0) in the case of d being 1. All the steps in the disclosed embodiments of the program are applied then in a respective matter.

Figure 8:
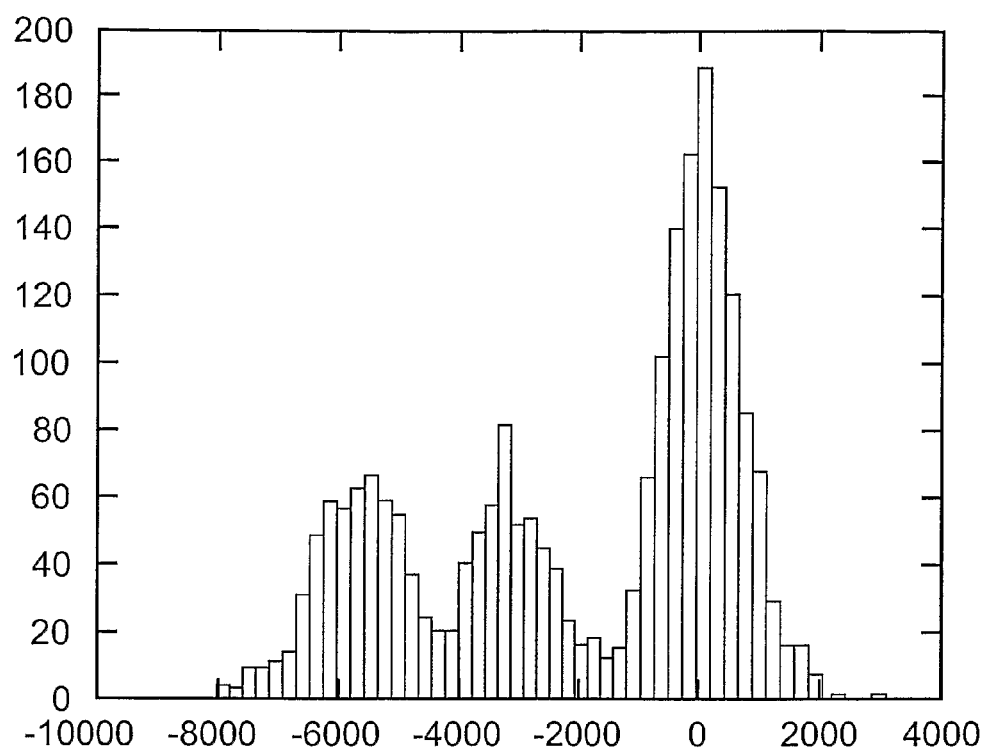
Figure 9:
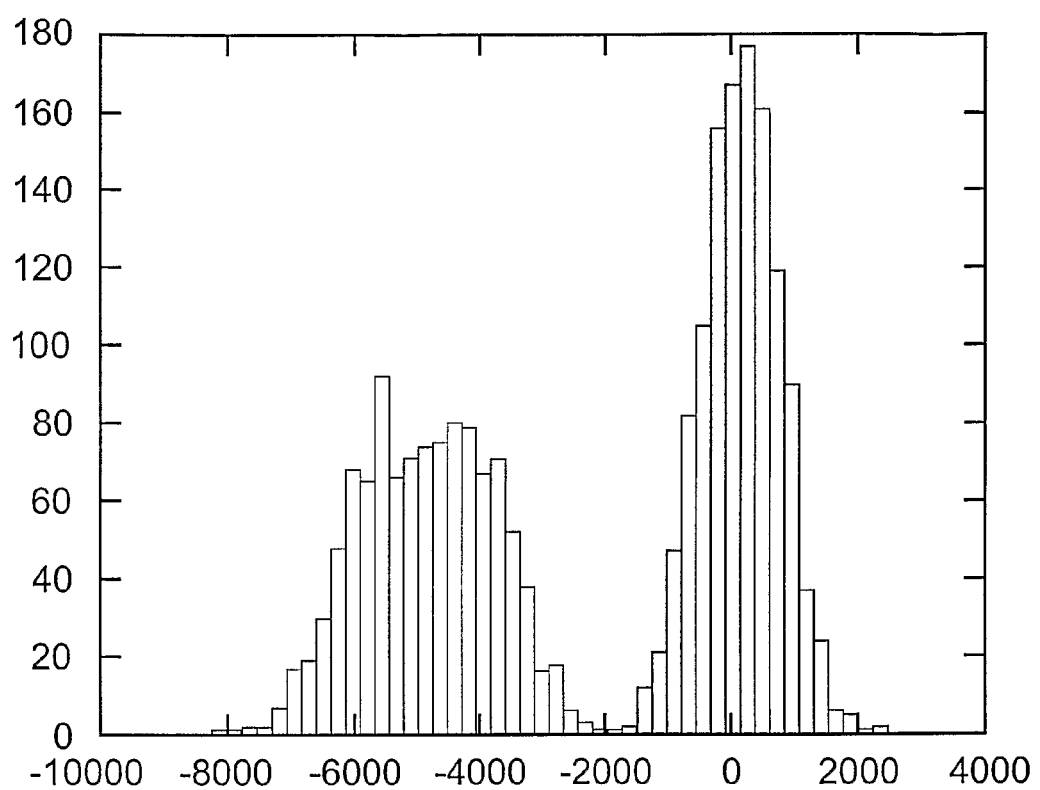

FIG. 8 shows a histogram of read-back samples without modifying the control parameter CTRL, if a given number of consecutive indentation marks 28 should be created. The histogram according to FIG. 8 shows that in this case there is a large number of samples which cannot be clearly allocated to either corresponding to an indentation mark 28 or to not corresponding to an indentation mark. The x-axis of the histogram denotes the amplitude of the respective read-back signal whereas the ordinate denotes the amounts of samples allocated to the respective amplitude value of a read-back signal. FIG. 9 shows a histogram of read-back samples employing the first embodiment of the program according to FIG. 6. In this there are clearly separated bins of samples. If a threshold determining whether a read-back sample corresponds to an indentation mark or not has the value of −2000 then there is a clear separation between indentation marks 28 and the absence of indentation marks.

Figure 10:
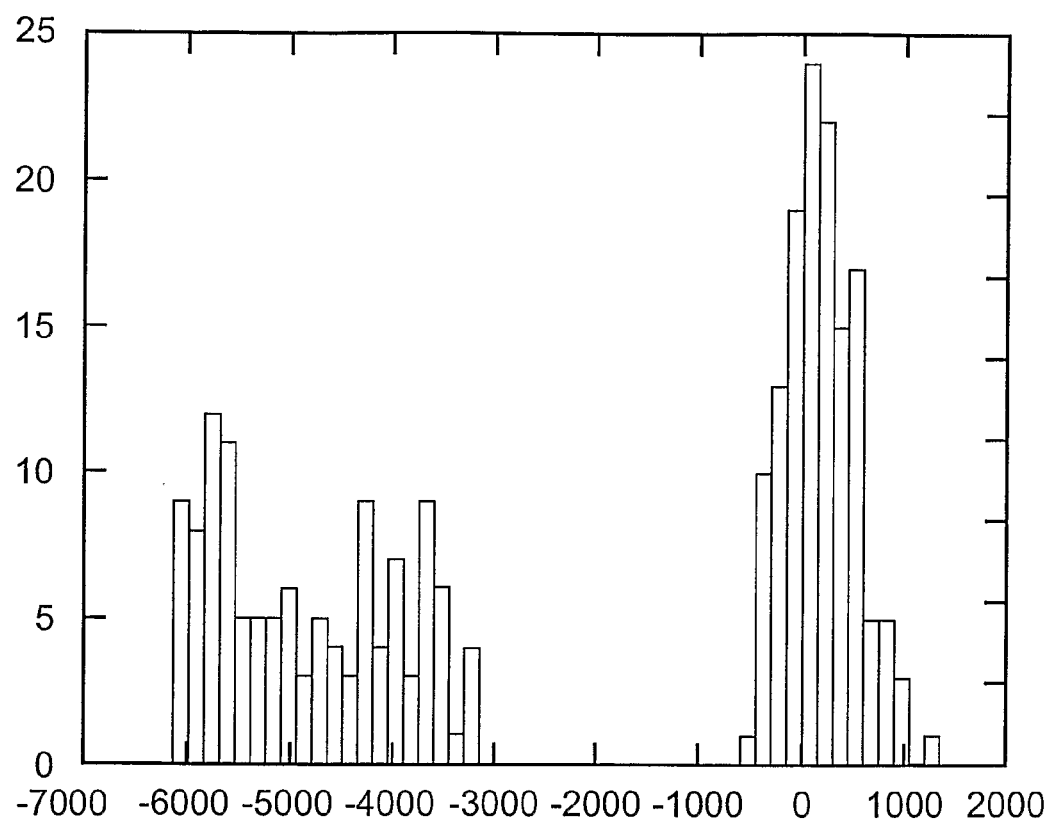

FIG. 10 shows another histogram of read-back samples employing the program of the first embodiment with an even clearer separation between the two bins.

The invention claimed is:

1. Data storage device comprising
   a storage medium;
   at least one probe for creating one or more indentation marks in said storage medium; and
   a control unit for generating a control parameter for said at least one probe to create one of said one or more indentation marks;
   wherein said control unit modifies said control parameter when at least a given number (n_thr) of consecutive indentation marks are to be created at a given minimum distance between each other.

2. Data storage device according to claim 1, wherein said control unit modifies said control parameter by varying the time of its application to said probe, resulting in a varying time between the formation of said consecutive indentation marks.

3. Data storage device according to claim 2, wherein said control unit modifies said control parameter by varying the time of its application to said probe such that said consecutive indentation marks are created with a shift (s) to a nominal minimum time interval between two consecutive indentation marks, said shift having a minimum value (s_min) for the first one of said consecutive indentation marks and gradually increasing to a maximum value (s_max) towards the last one of said consecutive indentation marks.

4. Data storage device according to claim 3, wherein said minimum value (s_min) has the same absolute value as said maximum value (s_max) and wherein an indentation mark in the middle of said consecutive indentation marks is created with a shift of a smallest absolute value.

5. Data storage device according to claim 1, wherein said control parameter influences a force (F) being exerted between said probe and said storage medium.

6. Data storage device according to claim 5, wherein said force (F) is decreased from a maximum force (F_max) applied for forming a first one of said consecutive indentation marks to a minimum force (F_min) applied for forming a last one of said consecutive indentation marks.

7. Data storage device according to claim 5, wherein said force (F) depends on a relative position of each of said consecutive indentation marks, decreases for a given number of consecutive indentation marks and is limited between said maximum and minimum force (F_max, F_min) and is independent from a total number of consecutive indentation marks.

8. Data storage device according to claim 1, wherein said control parameter influences a heating power (P) being applied to said storage medium via said probe.

9. Data storage device according to claim 8, wherein said heating power (P) is decreased from a maximum heating power (P_max) applied for forming a first one of said consecutive indentation marks to a minimum heating power (P_min) applied for forming a last one of said consecutive indentation marks.

10. Data storage device according to claim 8, wherein said heating power (P) depends on said relative position of each of said consecutive indentation marks, decreases for a given number of consecutive indentation marks and is limited between said maximum and minimum heating power (P_max, P_min) and is independent from a total number of consecutive indentation marks.

11. Data storage device according to claim 1, further comprising a coding unit for coding information being represented by the existence or absence of indentation marks whereby at least a minimum number of absent indentation marks is placed between units of information represented by consecutive indentation marks.

12. Data storage device according to claim 1, comprising a further coding unit for coding information represented by the existence or absence of indentation marks whereby a given number of consecutive indentation marks with said given minimum distance between each other, is not exceeded.

13. A method for operating a data storage device comprising a storage medium, at least one probe designed for creating indentation marks in said storage medium and a control unit, the method comprising the following steps performed by said control unit:
   creating a control parameter for said probe to create one of said indentation marks;
   monitoring the number of consecutive indentation marks to be created; and
   modifying said control parameter if at least a given number of consecutive indentation marks are to be created with a given minimum distance of each other.

14. Method according to claim 13, wherein said control parameter is modified by varying the time of its application to said probe resulting in a varying time between the formation of said consecutive indentation marks.

15. Method according to claim 14, wherein said consecutive indentation marks are created with a shift (s) to a nominal minimum time-interval between two consecutive indentation marks, wherein said shift (s) has a minimum value (s_min) for the first one of said consecutive indentation marks and gradually increases to a maximum value (s_max) towards the last one of said consecutive indentation marks.

16. Method according to claim 15, wherein said minimum value (s_min) has the same absolute value as said maximum value (s_max) and an indentation mark in the middle of said consecutive indentation marks is created with a shift of a smallest absolute value.

17. Method according to claim 13, wherein said control parameter influences a force (F) being exerted between said probe and said storage medium.

18. Method according to claim 17, wherein said force (F) is decreased from a maximum force (F_max) applied for forming a first one of said consecutive indentation marks to a minimum force (F_min) applied for forming a last one of said consecutive indentation marks.

19. Method according to claim 17, wherein said force (F) depends on said relative position of each of said consecutive indentation marks, decreases for a given number of consecutive indentation marks, and is limited between said maximum and minimum force (F_max, F_min) and is independent from a total amount of consecutive indentation marks.

20. Method according to claim 13, wherein said control parameter influences a heating power (P) being applied to said storage medium via said probe.

21. Method according to claim 20, wherein said heating power (P) is decreased from a maximum heating power (P_max) applied for forming a first one of said consecutive indentation marks to a minimum heating power (P_min) applied for forming a last one of said consecutive indentation marks.

22. Method according to claim 20, wherein said heating power (P) depends on said relative position of each of said consecutive indentation marks, decreases for a given number of consecutive indentation marks and is limited between said maximum and minimum heating power (P_max, P_min) and is independent from a total amount of consecutive indentation marks.

23. Method according to claim 13, further comprising a coding unit coding information represented by the existence or absence of indentation marks such that at least a minimum number of absent indentation marks is placed between units of information represented by consecutive indentation marks.

24. Method according to claim 13, wherein a further coding unit codes information represented by the existence or absence of indentation marks such that a given number of consecutive indentation marks with said given minimum distance between each other is not exceeded.

\* \* \* \* \*